United States Patent
Gottwald

(10) Patent No.: US 7,619,812 B2
(45) Date of Patent: Nov. 17, 2009

(54) METHOD AND ARRANGEMENT FOR THE RAPID ADJUSTMENT OF THE TILT OF OPTICAL WDM SIGNALS

(75) Inventor: Erich Gottwald, Holzkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 347 days.

(21) Appl. No.: 11/200,478

(22) Filed: Aug. 9, 2005

(65) Prior Publication Data

US 2006/0044657 A1  Mar. 2, 2006

(30) Foreign Application Priority Data

Aug. 11, 2004 (DE) .................. 10 2004 039 025

(51) Int. Cl.
*H04B 10/17* (2006.01)
*H04B 10/12* (2006.01)

(52) U.S. Cl. ............... 359/334; 359/337.1; 359/337.11

(58) Field of Classification Search ............ 359/334, 359/337.1, 337.11, 337
See application file for complete search history.

(56) References Cited

U.S. PATENT DOCUMENTS

| 6,639,715 | B2 * | 10/2003 | Naito et al. ............... 359/334 |
| 7,180,654 | B2 * | 2/2007 | Sugaya et al. ............. 359/334 |
| 2002/0101652 | A1 * | 8/2002 | Hayashi et al. .......... 359/341.4 |
| 2003/0105715 | A1 | 6/2003 | Friedman et al. |
| 2003/0151799 | A1 | 8/2003 | Wight et al. |
| 2004/0080812 | A1 * | 4/2004 | Sugaya et al. ............. 359/334 |
| 2004/0156095 | A1 * | 8/2004 | Tsuzaki et al. ............ 359/334 |

FOREIGN PATENT DOCUMENTS

| EP | 0 933 894 A1 | 8/1999 |
| EP | 1 278 315 A1 | 1/2003 |
| WO | WO 99/29057 | 6/1999 |

* cited by examiner

*Primary Examiner*—Eric Bolda
(74) *Attorney, Agent, or Firm*—Dickinson Wright PLLC

(57) ABSTRACT

An anti-pump laser (AL) is used in addition to a tilt correction pumplaser (KL) for Raman tilt control, said anti-pump laser injecting an anti-pump signal into a transmission fiber (FI) or a dispersion compensation fiber (DCF). The anti-pump laser (AL) has the function of reducing the pump energy of the control pump laser (KL) in the course of the fiber (FI, DCF), in order to restrict its effective length and to enable a faster adjustment of the tilt.

21 Claims, 5 Drawing Sheets

METHOD AND ARRANGEMENT FOR THE RAPID ADJUSTMENT OF THE TILT OF OPTICAL WDM SIGNALS

CROSS REFERENCE TO RELATED APPLICATIONS

This application claims priority to the German application No. 10 2004 039 025.8, filed Aug. 11, 2004 and which is incorporated by reference herein in its entirety.

FIELD OF INVENTION

The invention relates to a method and arrangement for the rapid adjustment of the tilt of optical WDM signals.

SUMMARY OF THE INVENTION

Groups of optical signals with different wavelengths, abbreviated to WDM signals, are transmitted via a fiber optic cable, with which fiber amplifiers using specially doped fibers, being frequently used for amplifying such signals, or (additionally) the Raman effect also being used in the transmission fibers.

With a WDM method, a number of data signals (channels) are combined in each instance into a channel group. As a rule, the "channels" of a transmission band are collectively amplified. The Raman effect results in a tilting of the signal during the transmission, i.e. to an attenuation of the level of the signals with a smaller wavelength/higher frequency and an amplification of the signals with a larger wavelength/lower frequency. This unwanted tilting, in most cases termed as tilt, is compensated for by means of non-linear amplifiers or filters for instance.

WO 99/29057 discloses a method for compensating for the tilt, the tilt being advantageously changed preferably by means of two additional pump signals injected into the transmission fiber. Both pump signals change the tilt in the same rotational direction. In addition, an amplification or attenuation can be achieved depending on whether its frequency is greater or lesser than that of the channel group. This principle can be used for tilt control with the failure of the entire channel group and with the absence of individual signals.

If the transmission takes place in the C-band with a typical total power of 100 mW per amplification section and with channel groups with 80 channels, the stimulated Raman scattering SRS causes an attenuation difference of more than 1 dB. In the case of paths with 10 to 20 amplification sections, the level differences without correction measures in an area between 1528 and 1565 nm result in 10 to 20 dB.

In optical networks with optical add/drop multiplexers (OADM) the level of the channels at the fiber end and thus at the input of the recipient or amplifier also changes due to the additional switching or path switching by optical channels resulting from the SRS with the tilt. A path switch from "red" channels or a fiber tear can result in the reception level of the "blue" channel lying outside the input range of the recipient and thus result in increased non-linearities; the additional switching on of red channels impairs the signal-to-noise ratio for "blue" wavelengths. Corresponding additional switching and path switching for blue channels.

Consequentially, a "connected" network requires dynamic tilt compensators. The hitherto mechanically adjustable compensators known for example from the publication are too slow. Nevertheless the compensation method relating to the practical non-inertial Raman effect known from WO 99/29057 is approaching its limits even with the use of a feed-forward control as a result of the transit time of the light in the fiber and the delay of the correction effect linked therewith.

The object of the invention is to specify a method and an arrangement for rapid tilt control. Furthermore an arrangement suited thereto is specified.

The object is achieved by the claims.

Advantageous developments are described in the dependent claims.

The combination of a tilt correction pump signal (or a number of these pump signals) with an anti-pump signal (or several) is advantageous. The shortening of the tilt adjustment time relates to the shortening of the effective section of the fiber optic cable for the correction pump signal adjusting the tilt by means of stimulated Raman scattering (SRS). This shortening is achieved by, in addition to the correction pump signal, injecting an anti-pump signal additionally into the same fiber, which continuously absorbs more energy of the correction pump signal with an increasing distance from the injection location.

The adjustment time is further reduced by the correction pump signal and the anti-pump signal being injected into a dispersion compensation fiber (DCF) instead of into the transmission fiber.

The known principle of a forward (control) or a backward control or a combination thereof can be used to adjust the tilt and the amplitude.

The invention is described in more detail with reference to exemplary embodiments.

DETAILED DESCRIPTION OF THE INVENTION

Figure 1:
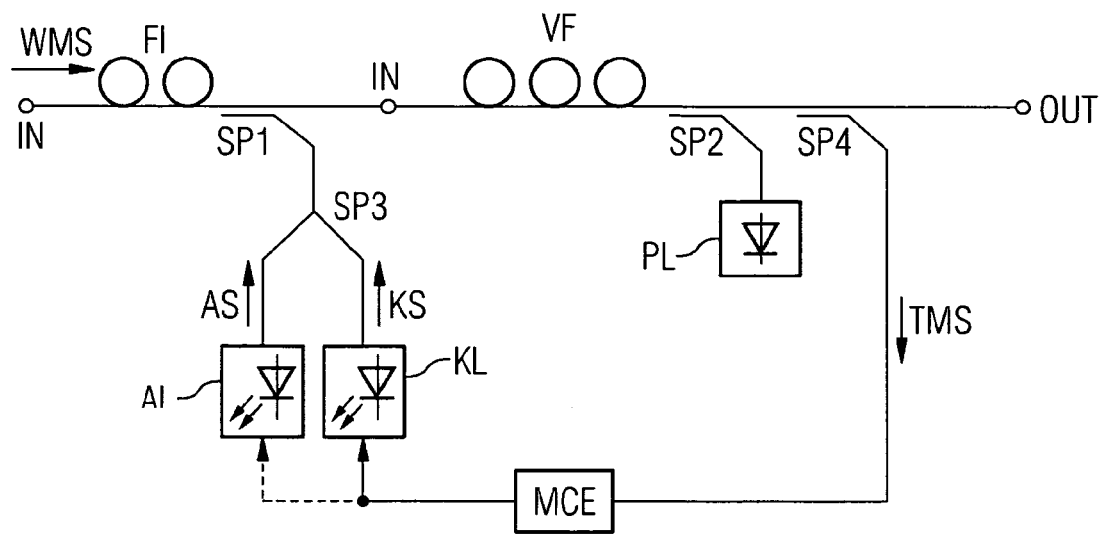
FIG. 1 shows a principle arrangement.

FIG. 1 shows a principle arrangement for tilt correction and/or tilt adjustment. An optical wavelength multiplex signal WMS is fed to the input IN of a fiber amplifier by means of a transmission fiber FI. This is pumped by a pump laser PL via the splitter SP2 against the transmission direction. (At least) one tilt correction pump laser KL is provided for tilt adjustment/compensation, the correction signal KS of which is combined with an anti-pump signal AS of an anti-pump laser AL by a splitter SP2 at first and then injected into the transmission fiber FI. A measurement and control device MCE is provided to measure the tilt, said device diverging and monitoring a tilt measurement signal TMS from the output signal and correspondingly controlling the tilt correction pump laser KL. It can also control the power of the anti-pump laser AL if necessary.

The measurement and control unit MCE controls the correction pump laser in the simplest case, whilst the anti-pump laser AL is constantly active. In the case of a busy system, the amplifier in an active anti-pump laser AL is designed such that the tilt and the level is correctly adjusted at the output OUT. Typically no tilt should be present and the amplitudes of the entire individual signals should correspond to a predetermined value.

Figure 2:
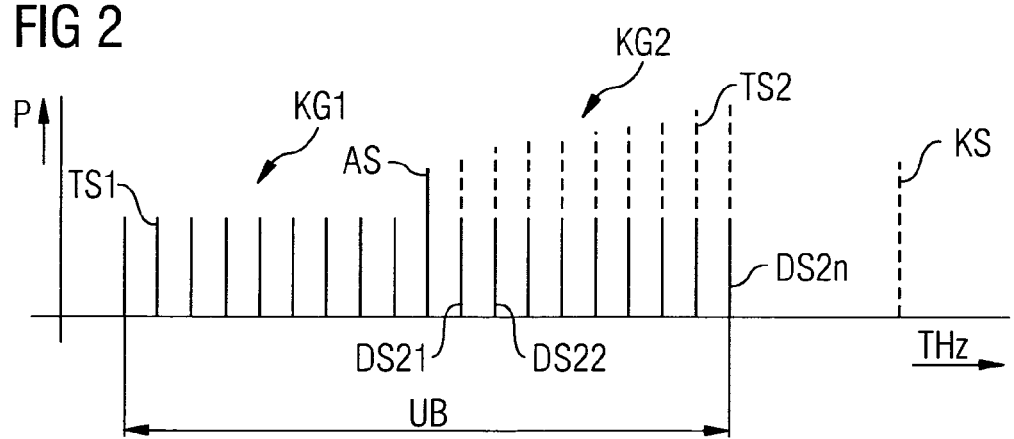
FIG. 2 shows a diagram with two channel groups and the pump signals.

An optical WDM system is considered for example, with which two channel groups KG1 and KG2 are transmitted with 40 channels/data signals DS1, DS2 . . . in the C-band in each instance, as shown in FIG. 2. The frequency of the anti-pump signal AS lies between these transmission bands. This then causes a tilt change around a fixed pivot point. The frequency of the correction laser lies outside the transmission band used.

If the channels now fail or are not busy, as for example all channels of the channel group KG1, then the level P of the data signals DS21, DS22, . . . , DS2n, . . . of the second channel group KG2 tilts anticlockwise (dotted line). By switching on the tilt correction pump laser KL and/or by increasing the power of its pump signal, the tilt is reversed, thereby changing the amplitude of all data signals.

It is advantageous for tilt adjustment that the anti-pump laser AL is permanently active. If the transmission channels are completely occupied, the amplifier is adjusted if necessary by using a tilt filter such that it comprises a level (or desired frequency linear) amplification gradient. With the absence of channels, the level is tilted anticlockwise with a relatively frequent representation of the data signals. To control the tilt, the tilt correction pump laser is switched on and/or its power increased, the correction pump signal KS of which however is more and more absorbed with an increasing distance from the injection location from the anti-pump signal AS, so that the effectiveness of the correction pump signal KS significantly reduces even after running through a short stretch of the transmission fiber FI and the final value is achieved. The power of the anti-pump laser corresponds approximately to that of the tilt correction pump laser, it should lie in a range between 0.5 and twice the power of the tilt correction pump laser.

A number of pump lasers of the same or advantageously selected frequencies can naturally also be used instead of a tilt correction pump laser and/or an anti-pump laser.

The fiber amplifier is generally equipped with an amplification control, so that the output level changes according to the input level, and is thus greater with the use of a 'blue' correction pump laser (with a higher frequency). The amplitudes of the data signals can be retained at the desired value via an additional (correction) pump laser, by means of an amplification change or by means of a frequency-independent, controllable optical attenuator.

The use of a number of pump sources allows the amplification and the tilt to change independently of one another in a known manner. Furthermore, measures for linearization of the amplification curve can naturally be taken in each amplifier.

Figure 3:
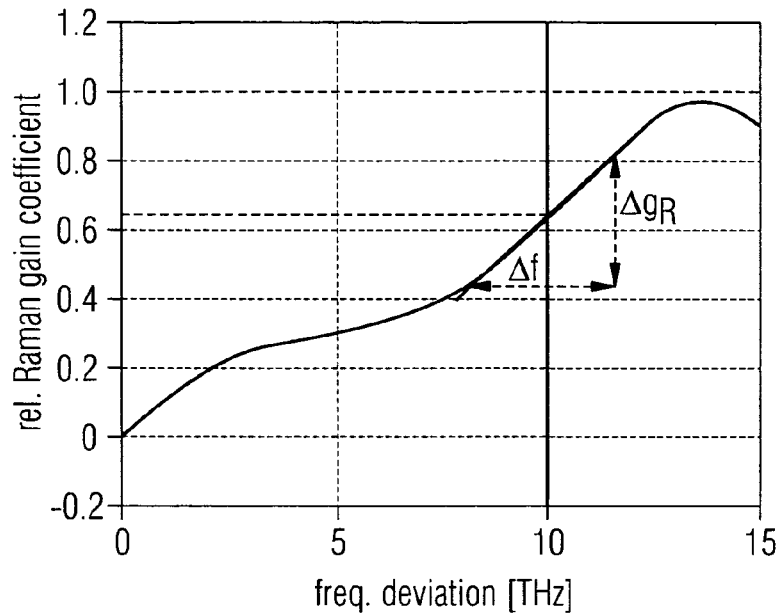
FIG. 3 shows the amplification diagram of a Raman amplifier.

The selection of the frequency of the correction pump signal complies with the Raman amplification diagram and the transmission band and/or channel group used. The diagram of the Raman amplification as a function of the ratio pump laser signal is illustrated in FIG. 3. The frequency deviation of the correction pump signal to the transmission band is selected such that the most linear amplification curve possible (in the logarithmic measure, for example 2B) is given, and this lies at a distance of approximately 10 THz (TeraHertz) from the center of the transmission band used. The same characteristic curve applies to the attenuation. The frequency of the anti-pump signal AS can be selected such that it lies in the center of the transmission band used between the channel groups KG1 and KG2 and thus has a distance of approximately 10 THz (between 7 Thz and 13 THz) to the correction pump signal. Only one tilt is hereby effected by means of the anti-pump signal. The distance can also be selected such that it lies at approximately 10 THz below the frequency of the transmission band (between 18 THz and 22 THz). In this way the influence is maximally linear with the simultaneous reduction of the amplification. These values apply to conventional fibers and may need to be adapted in the future.

Depending on the control accuracy required, it is sufficient, in the simplest case, to measure the total power of all channels, since the tilt is essentially determined by the total power. The level of external signals of the wavelength multiplex signal WMS can also be measured, or inserted tilt control signals TS1 and TS2 (FIG. 2) which for instance, instead of data signals within the transmission band used, are transmitted at its edges. The tilt control signal also lies outside the transmission band used for the transmission of data signals if this does not result in fault measurements, in particular determined by the transmission characteristics of the amplifier. Similarly, more than two measurement signals can be used for more precise calculation of the tilt and more than one correction pump signal for improved (also no longer linear) correction. The transmission band used can comprise a part of the C-band for the transmission of a channel group for instance.

The adjustment time of the tilt depends on the effective length of the fiber into which the control pump signal is injected. This depends on the performance ratio of the control pump signal and the anti-pump signal and also on the attenuation of the tilt correction pump signal KS in the fiber.

Figure 4:
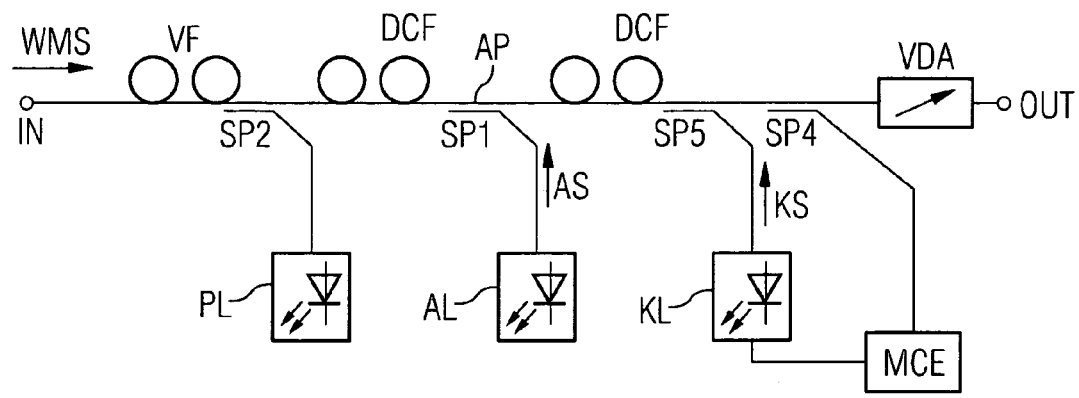
FIG. 4 shows an advantageous variant for the tilt correction.

FIG. 4 shows an improved arrangement for tilt correction. The fiber amplifier contains the series circuit of an amplification fiber VF and a dispersion compensation fiber DCF. The tilt correction pump signal KS is fed to the output of the dispersion compensation fiber via a splitter SP5 and the anti-pump signal AS between two sections of the dispersion compensation fiber via the splitter SP1. In this way, the compensation pump signal KS remains fully active on the output side section of the DCF and is reduced at first during the course of the front section. An even faster reduction of the energy of the correction pump signal KS is reached again by joint injection with the anti-pump signal. The more favorable variant is selected depending on the requirements in terms of adjustment time.

Similarly it is possible to inject the correction pump signal and the anti-pump signal in opposing directions. The compensation pump signal can also be injected on the send side if a corresponding measurement and control device is provided there.

Figure 5:
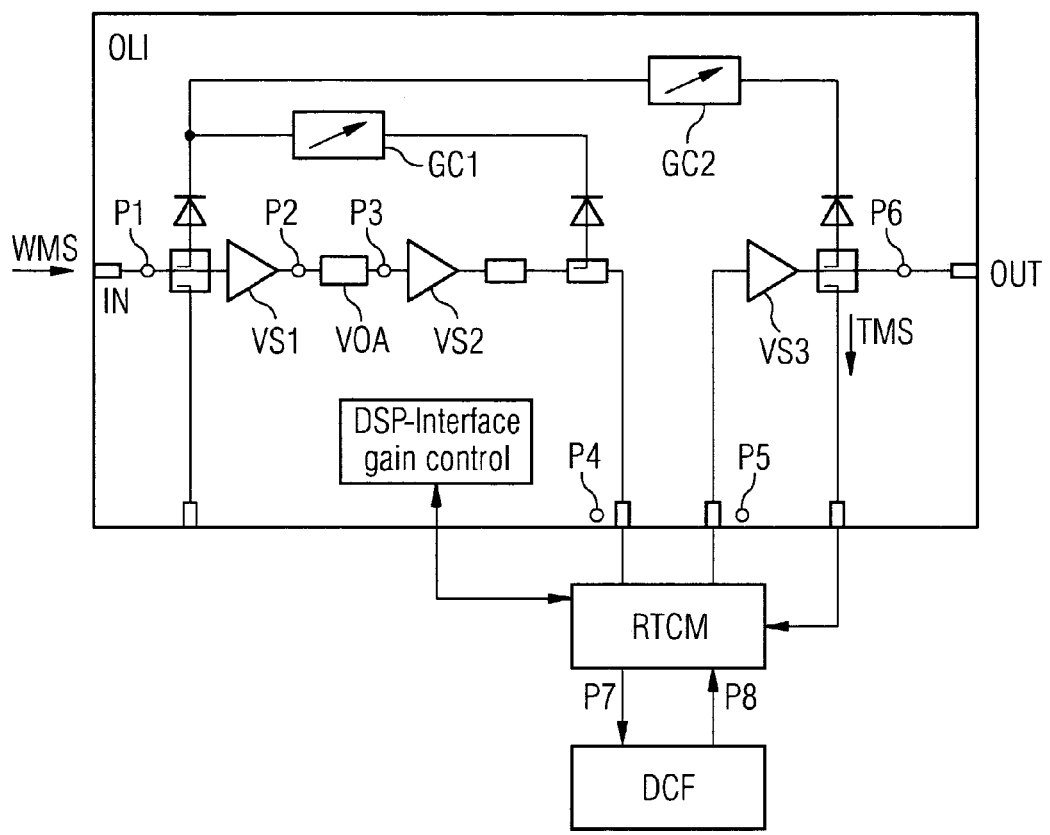
FIG. 5 shows an exemplary embodiment of a fiber amplifier with tilt correction.

FIG. 5 shows a simplified exemplary embodiment of a fiber amplifier OLI with a Raman tilt control module connected thereto. The fiber amplifier OLI is a three-stage (optical line) amplifier with three amplifier stages VS1, VS2 and VS3. The amplification is controlled by means of the amplification control units GC1 and GC2. The amplifier can contain one or a number of gain smoothing filters GFF and optical attenuators VOA. In this case, the Raman tilt control module RTMC is switched on using associated dispersion compensation fibers DCF between the second amplification stage VS2 and the third amplification stage VS3. The wavelength multiplex signal WMS is amplified in the first of two amplification stages VS1, VS2, and is then finally connected through the control module RTCM and finally passed through the dispersion compensation fiber (DCF), the tilt correction pump signal KS and the anti-pump signal AS being injected into the output P8 of said DCF in an opposite direction to the signal direction of the wavelength multiplex signal. The wavelength multiplex signal WMS is injected via the connection points P4, P7, the DCF and the connections P8 and P5 of the control module RTCM, then re-amplified in the third amplification stage VS3 of the control module RTCM and output at the output OUT.

The tilt measurement signal TMS is split off at the output of the third stage VS3, said signal containing either the whole spectrum or already selectively the tilt control signals TS1 and TS3, (FIG. 2). The tilt is determined from the tilt measurement signal TMS and the tilt correction pump signal KS is correspondingly adjusted and/or controlled.

The correction pump signal itself is monitored by means of a split-off measurement signal in a pump signal monitor PM. A smoothing filter GFF balances out non-linearities and a wavelength blocker WB prevents the transmission of pump signals.

Splitters etc have not been shown in the diagram.

The tilt is corrected again by changing the power of the tilt correction pump signal KS. A further necessary correction of the level of the output signal takes by place by intervention in the amplifier control or is carried out by the module internal attenuator VOAC. To elaborate, the tilt of the amplifier is changed by the change of the attenuator, thereby increasing the control area.

Figure 6:
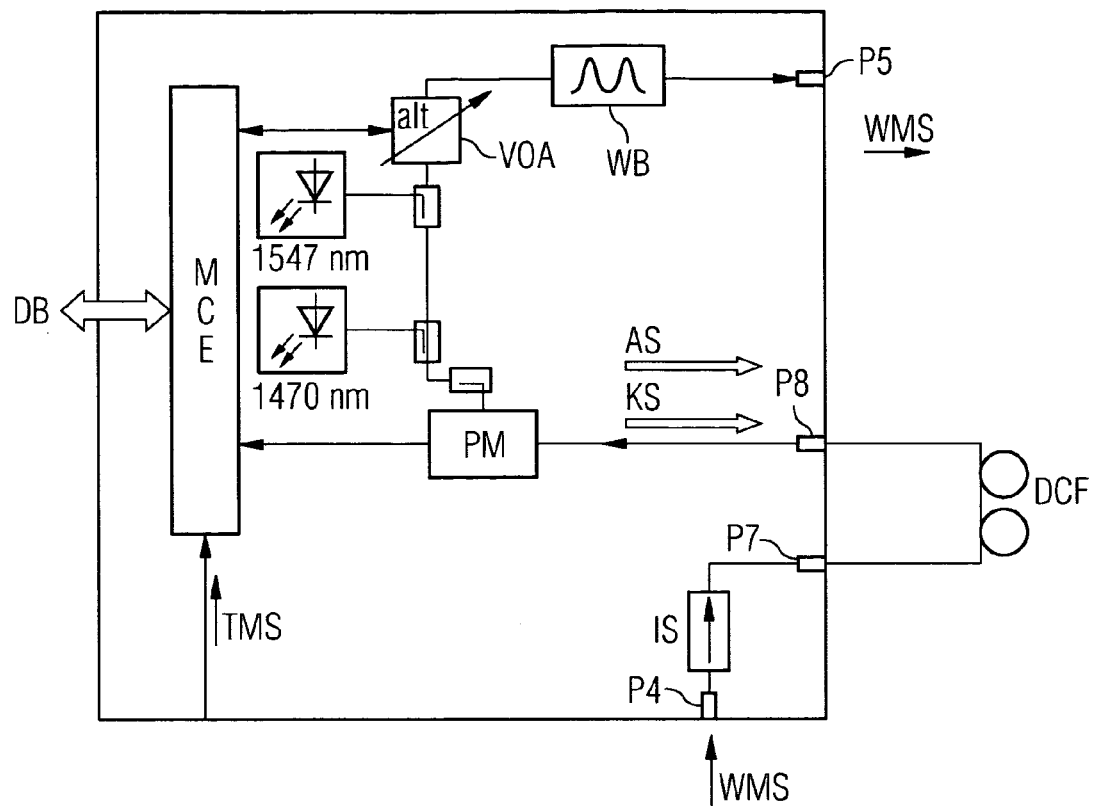
FIG. 6 shows an exemplary embodiment of a tilt control module.

The Raman tilt module RTCM is shown in FIG. 6, in which the description of the connection points is in line with FIG. 5. As already described, the wavelength multiplex signal WMS is connected through between the connection points P4 and P7, in which the pump signals are blocked by means of an insulator IS. The dispersion compensation fiber DCF is shown again for clarification purposes. The tilt control pump signal KS and the anti-pump signal AS is injected into the output at the connection point P8. The routing of the control signal and the anti-pump signal in the signal direction are prevented by a wavelength blocker WB. The measurement and control unit MCE is connected to the system via a databus DB.

Figure 7:
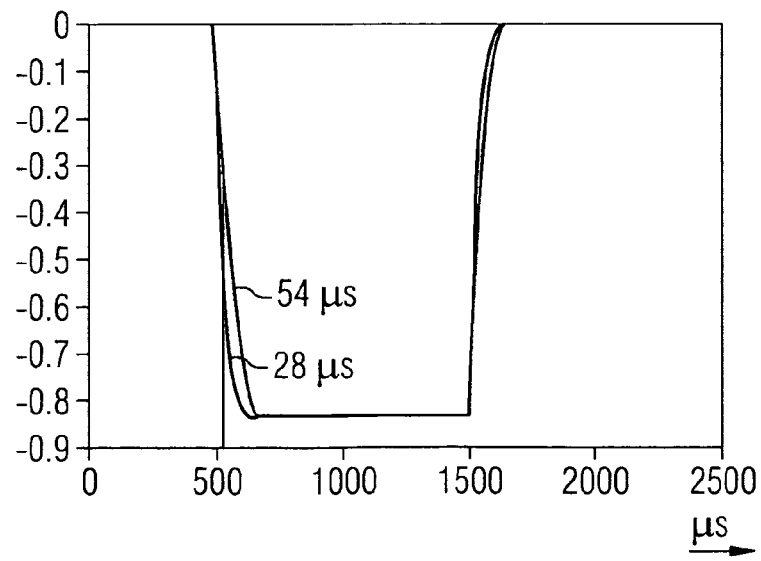
FIG. 7 shows a diagram of the adjustment time.

FIG. 7 shows the shortening of the adjustment time achieved by the invention. In this exemplary embodiment described, the adjustment time is reduced from 54 µs to 28 µs.

Figure 8:
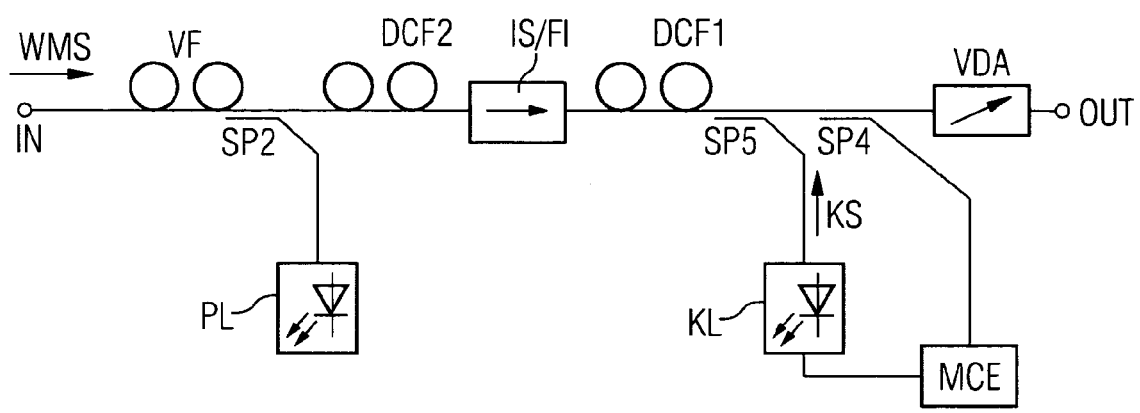
FIG. 8 shows a variant for rapid tilt correction.

FIG. 8 shows a simplified embodiment with an insulator IS or filter F1, which is inserted between two winding sections of the dispersion-compensating fiber DCF1 and DCF2, in order to restrict their effective length for the tilt correction pump signal KS. This also includes the limiting case, in which the insulator IS or the filter FI of the whole DCF is arranged downstream in relation to the tilt control pump signal KS. The same effect is achieved with the transmission fiber. Although this variant does not have the adaptability of an adjustable anti-pump laser AL, it is nevertheless particularly easy to implement.

The invention claimed is:

1. A method for a rapid tilt adjustment of a wavelength multiplex signal transmitted over a fiber optical waveguide, the method comprising:
   measuring the tilt and/or a level of the wavelength multiplex signal at an output of the fiber optical waveguide;
   generating at least one tilt correction pump signal having a frequency outside a used transmission band;
   controlling the power of the tilt correction pump signal according to the measured tilt and/or level of the wavelength multiplex signal;
   injecting the at least one tilt correction pump signal into the fiber optical waveguide in the opposite direction of the transmission direction of the wavelength multiplex signal; generating an anti-pump signal absorbing energy of the tilt correction pump signal, the anti-pump signal having a frequency deviation to the tilt correction pump signal and a power between 0.5 times and 2 times of the tilt correction pump signal; and
   injecting the anti-pump signal into the fiber optical waveguide in the opposite direction of the transmission direction of the wavelength multiplex signal.

2. The method according to claim 1, wherein the frequency deviation to the tilt correction pump signal is in the range between 7 THz and 13 THz or in the range between 18 THz and 22 THz.

3. The method according to claim 1, wherein the anti-pump signal is generated with a frequency which lies approximately in the center of the transmission band used.

4. The method according to claim 3, wherein the anti-pump signal is generated with a frequency which lies between two channel groups of the transmission band used.

5. The method according to claim 1, wherein the anti-pump signal is injected continuously and independent of the tilt and the level of the wavelength multiplex signal.

6. The method according to claim 1, wherein the anti-pump signal and the tilt correction pump signal are injected into the fiber optical waveguide in the opposite direction to the transmission direction of the wavelength multiplex signal.

7. The method according to claim 1, wherein the anti-pump signal is injected into the fiber optical waveguide in the opposite direction to the transmission direction of the tilt correction pump-signal.

8. The method according to claim 1, wherein the tilt correction pump signal and the anti-pump signal are injected into a transmission fiber or a dispersion compensation fiber being sections of the fiber optical waveguide guiding the wavelength multiplex signal.

9. The method according to claim 8, wherein the anti-pump signal is injected into a tapping point of the dispersion compensation fiber.

10. The method according to claim 1, further comprising: performing an amplification control.

11. The method according to claim 10, wherein the amplification control is performed by a controllable optical attenuator.

12. The method according to claim 1, wherein the tilt and/or the level of the data signals forming the WDM signal is indirectly measured with the aid of two tilt control signals transmitted at the edges of the transmission band used.

13. An arrangement for rapid tilt adjustment of a wavelength multiplex signal transmitted over a fiber optical waveguide, the arrangement comprising:
   at least one controlled tilt correction pump laser, generating a tilt correction pump signal, which frequency lies outside a transmission band used; and
   an anti-pump laser, generating an anti-pump signal absorbing energy of the tilt correction pump signal and having a frequency deviation to the tilt correction pump signal and a power between the 0.5 times and 2 times the tilt correction pump signal;
   a device for feeding the tilt correction pump signal and the anti-pump signal into the fiber optical waveguide in the opposite direction of the transmission direction of the wavelength multiplex signal; and
   a measurement and control device at an output of the fiber optical waveguide for determining the tilt and/or the level of the wavelength multiplex signal and for controlling the power of the tilt correction pump signal.

14. The arrangement according to claim 13, wherein the anti-pump signal of the anti-pump laser has a frequency deviation from the tilt correction pump signal of the tilt correction pump laser between 8 THz and 12 THz or 18 THz and 22 THz.

15. The arrangement according to claim 13, wherein the tilt correction pump laser injects its tilt correction pump signal and the anti-pump laser injects its anti-pump signal into a dispersion compensation fiber being a section of the fiber optical waveguide guiding the wavelength multiplex signal.

16. The arrangement according to claim 15, wherein in the transmission fiber or in the dispersion compensation fiber an insulator or filter which blocks the tilt correction signal is inserted-downstream in relation to the tilt correction pump signal.

17. The arrangement according to claim 13, wherein an optical attenuator is arranged in the signal path of the WDM signal for controlling the level.

18. The arrangement according to claim 13, wherein anti-pump signal is injected continuously and uncontrolled by the measurement and control device.

19. The arrangement according to claim 13, wherein the arrangement is arranged on a Raman tilt control module.

20. The arrangement according to claim 8, wherein the arrangement is arranged on a Raman tilt control module.

21. The arrangement according to claim 13, wherein the fiber optical wave guide is pumped against the transmission direction of the wavelength multiplex signal by a farther pump laser.

* * * * *

UNITED STATES PATENT AND TRADEMARK OFFICE
CERTIFICATE OF CORRECTION

PATENT NO.       : 7,619,812 B2                                          Page 1 of 1
APPLICATION NO. : 11/200478
DATED            : November 17, 2009
INVENTOR(S)      : Erich Gottwald It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 593 days.

Signed and Sealed this

Twenty-sixth Day of October, 2010

David J. Kappos
*Director of the United States Patent and Trademark Office*